(12) United States Patent
McAuley et al.

(10) Patent No.: US 11,792,451 B2
(45) Date of Patent: *Oct. 17, 2023

(54) METHOD AND SYSTEM FOR LOW LATENCY HIGH FRAME RATE STREAMING

(71) Applicant: NVIDIA Corporation, Santa Clara, CA (US)

(72) Inventors: Alexander McAuley, Santa Clara, CA (US); Haitao Xue, Santa Clara, CA (US); Hassane S. Azar, Santa Clara, CA (US); Bipin Todur, Santa Clara, CA (US); Alan Larson, Santa Clara, CA (US); Reza Marandian Hagh, Hagh, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/196,899

(22) Filed: Mar. 9, 2021

(65) Prior Publication Data

US 2021/0195262 A1 Jun. 24, 2021

Related U.S. Application Data

(63) Continuation of application No. 16/179,857, filed on Nov. 2, 2018, now Pat. No. 10,979,744.

(Continued)

(51) Int. Cl.
*H04N 21/2343* (2011.01)
*H04N 21/258* (2011.01)
(Continued)

(52) U.S. Cl.
CPC ... *H04N 21/234381* (2013.01); *H04N 19/172* (2014.11); *H04N 21/23805* (2013.01);
(Continued)

(58) Field of Classification Search
CPC ............... H04N 19/146; H04N 19/172; H04N 21/234381; H04N 21/23805;
(Continued)

(56) References Cited

U.S. PATENT DOCUMENTS 5,389,965 A 2/1995 Kuzma
5,490,247 A 2/1996 Tung et al.
(Continued)

FOREIGN PATENT DOCUMENTS

CN 103702119 4/2014

OTHER PUBLICATIONS

Chen, Kuan-Ta, Experiment Setup, Gaming Anywhere, Retrieved from URL <http://gaminganywhere.org/perf.html> on Jun. 9, 2021.
(Continued)

*Primary Examiner* — Peter D Le
(74) *Attorney, Agent, or Firm* — Taylor English Duma L.L.P.

(57) ABSTRACT

Embodiments of the present invention provide a low-latency approach for local or remote application streaming that reaches high FPS targets without overloading the available streaming bandwidth, for example, by limiting the bit rate to the same value that is used by traditional 60 FPS streaming solutions. A client device and server device cooperate to actively monitor and control a video stream to maintain an acceptable balance between latency and video quality by adjusting the frequency or resolution when necessary to improve the streaming experience. When the server device captures and transmits frames at a higher rate, the software stack executing on the client device is able to display frames with less delay, even on a display device limited to 60 Hz, thereby achieving additional latency reduction.

20 Claims, 9 Drawing Sheets

Related U.S. Application Data (60) Provisional application No. 62/581,558, filed on Nov. 3, 2017.

(51) Int. Cl.

| | |
|---|---|
| *H04N 21/238* | (2011.01) |
| *H04N 19/172* | (2014.01) |
| *H04N 21/462* | (2011.01) |
| *H04N 21/2662* | (2011.01) |
| *H04N 21/6373* | (2011.01) |
| *H04N 21/442* | (2011.01) |
| *H04N 21/478* | (2011.01) |
| *H04N 21/432* | (2011.01) |
| *H04N 21/658* | (2011.01) |
| *H04N 19/146* | (2014.01) |

(52) U.S. Cl.
CPC ... *H04N 21/25825* (2013.01); *H04N 21/2662* (2013.01); *H04N 21/4325* (2013.01); *H04N 21/4424* (2013.01); *H04N 21/44209* (2013.01); *H04N 21/4621* (2013.01); *H04N 21/4781* (2013.01); *H04N 21/6373* (2013.01); *H04N 21/6582* (2013.01); *H04N 19/146* (2014.11)

(58) Field of Classification Search
CPC ......... H04N 21/25825; H04N 21/2662; H04N 21/4325; H04N 21/44209; H04N 21/4424; H04N 21/4621; H04N 21/4781; H04N 21/6373; H04N 21/6582
See application file for complete search history.

(56) References Cited

U.S. PATENT DOCUMENTS

| | | | |
|---|---|---|---|
| 6,141,380 A | 10/2000 | Krishnamurthy et al. | |
| 6,233,226 B1 | 5/2001 | Gringeri et al. | |
| 6,366,704 B1 | 4/2002 | Ribas-Corbera et al. | |
| 6,661,846 B1 | 12/2003 | Ota | |
| 6,694,060 B2 | 2/2004 | Liu et al. | |
| 7,139,313 B2 | 11/2006 | Wang | |
| 7,391,809 B2 | 6/2008 | Li et al. | |
| 7,984,179 B1* | 7/2011 | Huang | H04N 21/6373 |
| | | | 709/233 |
| 8,112,513 B2 | 2/2012 | Margulis | |
| 8,291,460 B1 | 10/2012 | Peacock | |
| 8,521,900 B2 | 8/2013 | Chang et al. | |
| 8,743,954 B1 | 6/2014 | Masterson | |
| 9,609,275 B2 | 3/2017 | Kuusela et al. | |
| 9,609,336 B2 | 3/2017 | Topiwala et al. | |
| 9,848,172 B2* | 12/2017 | DeAngelis | H04N 5/23206 |
| 10,229,540 B2 | 3/2019 | Bavor, Jr. et al. | |
| 10,349,059 B1 | 7/2019 | Good | |
| 10,582,233 B2 | 3/2020 | Hurst | |
| 2001/0017887 A1 | 8/2001 | Furukawa et al. | |
| 2001/0027398 A1 | 10/2001 | Kohno | |
| 2001/0050712 A1 | 12/2001 | Dunton et al. | |
| 2002/0037037 A1 | 3/2002 | Van Der Schaar | |
| 2002/0071052 A1 | 6/2002 | Itoh et al. | |
| 2002/0095367 A1 | 7/2002 | Mizunuma et al. | |
| 2003/0012560 A1 | 1/2003 | Mori et al. | |
| 2003/0031251 A1 | 2/2003 | Koto | |
| 2003/0140159 A1 | 7/2003 | Campbell et al. | |
| 2003/0142214 A1 | 7/2003 | Bourret | |
| 2003/0174769 A1 | 9/2003 | Nagumo et al. | |
| 2003/0190144 A1 | 10/2003 | Kuno et al. | |
| 2003/0195977 A1 | 10/2003 | Liu et al. | |
| 2003/0231259 A1 | 12/2003 | Yui et al. | |
| 2004/0031054 A1 | 2/2004 | Dankworth | |
| 2004/0218099 A1 | 11/2004 | Washington | |
| 2005/0012738 A1 | 1/2005 | Gong et al. | |
| 2005/0207501 A1 | 9/2005 | Auyeung | |
| 2006/0219861 A1 | 10/2006 | Wood | |
| 2006/0244839 A1 | 11/2006 | Glatron et al. | |
| 2007/0097257 A1 | 5/2007 | El-Maleh et al. | |
| 2007/0248170 A1 | 10/2007 | Baba et al. | |
| 2008/0055318 A1 | 3/2008 | Glen | |
| 2008/0130737 A1 | 6/2008 | Kamariotis et al. | |
| 2009/0174812 A1 | 7/2009 | Hong | |
| 2009/0185795 A1 | 7/2009 | Itani et al. | |
| 2010/0031606 A1 | 2/2010 | Kamenomostski | |
| 2010/0088736 A1 | 4/2010 | Besen | |
| 2010/0217888 A1 | 8/2010 | Ukita et al. | |
| 2010/0250766 A1 | 9/2010 | Riggert et al. | |
| 2010/0316066 A1 | 12/2010 | Leung | |
| 2011/0032419 A1 | 2/2011 | Sakaniwa et al. | |
| 2011/0109624 A1* | 5/2011 | Greenberg | G06F 1/324 |
| | | | 345/522 |
| 2011/0164679 A1 | 7/2011 | Satou et al. | |
| 2011/0267951 A1 | 11/2011 | Stanwood et al. | |
| 2013/0159375 A1 | 6/2013 | Perry et al. | |
| 2013/0204927 A1* | 8/2013 | Kruglikov | H04L 67/01 |
| | | | 709/203 |
| 2013/0335584 A1* | 12/2013 | Kato | H04N 5/772 |
| | | | 348/207.1 |
| 2014/0053031 A1 | 2/2014 | Breuninger | |
| 2014/0099074 A1 | 4/2014 | Kano | |
| 2014/0118478 A1* | 5/2014 | Nakazawa | H04N 19/115 |
| | | | 348/14.13 |
| 2014/0160136 A1 | 6/2014 | Kaburlasos et al. | |
| 2014/0173674 A1 | 6/2014 | Wolman et al. | |
| 2014/0321528 A1 | 10/2014 | Jung et al. | |
| 2014/0362918 A1* | 12/2014 | Bushell | H04N 19/146 |
| | | | 375/240.15 |
| 2015/0042641 A1* | 2/2015 | Schluessler | G06T 15/005 |
| | | | 345/419 |
| 2015/0139602 A1 | 5/2015 | Cho et al. | |
| 2016/0012795 A1 | 1/2016 | Banski et al. | |
| 2016/0055830 A1 | 2/2016 | Lee et al. | |
| 2016/0182919 A1 | 6/2016 | Kanda | |
| 2017/0105013 A1 | 4/2017 | Fairhurst et al. | |
| 2017/0195672 A1* | 7/2017 | He | H04N 19/154 |
| 2017/0230708 A1 | 8/2017 | Phillips et al. | |
| 2018/0130443 A1 | 5/2018 | Ansari et al. | |
| 2018/0278482 A1 | 9/2018 | LaBrie et al. | |
| 2018/0287943 A1 | 10/2018 | Hassan | |
| 2018/0288114 A1 | 10/2018 | Liu et al. | |
| 2018/0332252 A1 | 11/2018 | Wang et al. | |
| 2019/0200024 A1 | 6/2019 | Kubota | |

OTHER PUBLICATIONS

Low Latency Systems, Ittiam Systems, Feb. 2013, Retrieved from the internet: <https://www.ittiam.com/wp-content/uploads/2017/12/WP005_low-latency-systems.pdf> on Apr. 2, 2020.

* cited by examiner

METHOD AND SYSTEM FOR LOW LATENCY HIGH FRAME RATE STREAMING

CROSS-REFERENCE TO RELATED APPLICATIONS

This application is a continuation of Nonprovisional patent application Ser. No. 16/179,857, filed Nov. 2, 2018, entitled "METHOD AND SYSTEM FOR LOW LATENCY HIGH FRAME RATE STREAMING", which claims the benefit of and priority to Provisional patent Application No. 62/581,558, filed Nov. 3, 2017, entitled "METHOD AND SYSTEM FOR LOW LATENCY STREAMING OF GAME OR APPLICATION CONTENT WITH A HIGHER FRAME RATE VIDEO STREAM AND OTHER OPTIMIZATIONS", both of which are hereby incorporated by reference in their entirety.

FIELD

Embodiments of the present invention generally relate to the field of interactive streaming video. More specifically, embodiments of the present invention relate to systems and methods for providing highly-responsive graphical data for streaming applications.

BACKGROUND

There is a growing need in the field of computer graphics to mitigate latency when streaming, for example, 3D graphical data of an application (e.g., a computer game). Game streaming and remote application streaming traditionally suffer from low responsiveness due to limitations of most current implementations of the streaming software stack, which often lack latency optimizations and focus on the use of lower resolutions to improve hardware processing time. This traditional approach decreases quality and/or resolution to lower the streaming bit rate and time slice encode/transmit to mitigate pipeline delays, for example.

Furthermore, current approaches to latency mitigation for game and application streaming often aim to reach a 60 frames-per-second (FPS) target, which may cause a user to experience a delay between the time an input command is sent and the time when a new frame is generated and transmitted responsive to the command. The higher frame rate of the game rendering process ensures that the "response" frame corresponding to a user input is available earlier. For some applications, depending on the settings, the key response time (commonly referred to as the in-game latency or "IGL") can be multiple frames, and frames generated by the game at common v-sync intervals may not be fast enough. When v-sync is enabled, the GPU waits for the display device to signal when a new frame should be displayed. This causes the frame rate to be capped at a maximum rate equal to the refresh rate of the display device, and further, adds unwanted IGL as the GPU must wait for the display device to be ready to display a new frame before responding to the user input.

What is needed is an approach to streaming that is capable of reaching higher FPS targets to provide a more responsive experience while mitigating latency in the software stack without increasing the overall allocation of bandwidth used for streaming.

SUMMARY OF THE INVENTION

Embodiments of the present invention provide a low-latency approach for local or remote application streaming that reaches high FPS targets (e.g., 90 to 240 FPS) without overloading the available streaming bandwidth. This is performed in one or more embodiments by limiting the bit rate to the same value that is used by traditional 60 FPS streaming solutions.

Graphics systems in accordance with embodiments of the present invention generally use a server computing system to execute a graphics application and to stream the generated frames to a remote client system. The remote client system displays the frames, receives or detects user input in real-time, and transmits the user input back to the server, which alters the game play based on the user input.

According to embodiments of the present invention, the client device and server device cooperate to actively monitor and control a video stream to maintain an acceptable balance between latency and video quality by adaptively adjusting the frequency (e.g., FPS) or resolution when necessary to improve the streaming experience. When the server device captures and transmits frames at a higher rate (e.g., 90 to 240 FPS), more frames are rendered (compared to 60 FPS) and therefore a new frame will be ready responsive to user input more quickly, thereby achieving additional latency reduction.

According to one embodiment, a media streaming method executed on a server device is disclosed. The method includes accessing an upper frame rate limit, a lower frame rate limit, and a target frame rate for streaming frames to a remote client device, adjusting a streaming bit rate for streaming frames to the client device according to capabilities of the client device, determining a quality of the frames, decreasing the target frame rate when the quality of the frames is below a lower quality limit, increasing the target frame rate when the quality of the frames is above the upper quality limit, and streaming frames to the client device according to the target frame rate and the streaming bitrate. The above steps may be repeated for a plurality of frames.

According to another embodiment, a device for receiving streaming media is disclosed. The device includes a memory, a processor, and a memory resident application executing on the processor, where the application is operable to receive user input from an input device and display frames received from a remote server. The frames are generated by the remote server responsive to the user input, and the server dynamically determines a frame rate, a frame resolution and a bit rate for streaming frames to the device, captures frames from the application based on the frame rate and the frame resolution, encodes captured frames based on the bit rate, and transmits encoded frames from over a communication network for receipt by the device. The server receives a plurality of real-time system performance parameters and based thereon, with the real-time encoder quality parameter, dynamically determines the frame rate, the frame resolution and the bit rate. The plurality of real-time system performance parameters includes a real-time estimated frame rate input, a real-time estimated streaming frame rate input, and a real-time network parameter input.

According to yet another embodiment, a media streaming method is disclosed. The media streaming method includes receiving user input from a remote client, generating frames of an application at an application frame rate responsive to said user input, determining a frame rate and a bit rate for streaming frames to said remote client, capturing frames from said application based on said frame rate, encoding captured frames based on said bit rate and a real-time encoder quality parameter, receiving a plurality of real-time system performance parameters, where said determining is based on said plurality of real-time system performance parameters and said real-time encoder quality parameter, and transmitting encoded frames over a communication network for receipt by said remote client.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIG. 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "displaying," "writing," "including," "storing," "rendering," "transmitting," "traversing," "associating," "identifying," "capturing," "streaming," "encoding," "decoding," "monitoring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Low Latency High Frame Rate Streaming

Embodiments of the present invention provide a low-latency approach for game streaming and application remoting that reaches high FPS targets (e.g., 90 to 240 FPS)—without overloading the available streaming bandwidth—by limiting the bit rate to the same value that is used by traditional 60 FPS solutions. A client device and server device actively monitor and control the video stream to maintain an acceptable balance between latency and video quality by adjusting the frequency (e.g., FPS) or resolution when necessary to improve the streaming experience. When the server device captures and transmits frames at a higher rate (e.g., 90 to 240 FPS), the software stack executing on the client device is able to display frames at a faster rate, even on a display device limited to 60 Hz, thereby achieving additional latency reduction. Furthermore, vertical sync can be disabled to ensure that the client device can display frames faster than the refresh limit of the display device (e.g., 60 Hz) at the expense of screen tearing. In this way, the client device can render a frame as soon as the frame is ready without waiting for the previous frame to be completely scanned out.

Figure 1:
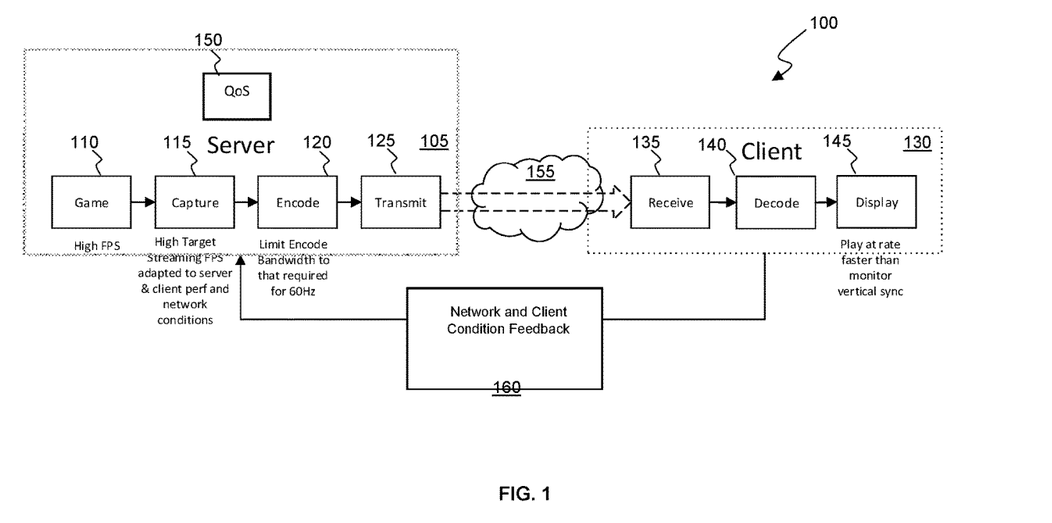
FIG. 1 is a block diagram of an exemplary application streaming system for capturing and transmitting frames at a high frame rate to mitigate latency according to embodiments of the present invention.

With regard to FIG. 1, an exemplary application streaming system 100 for capturing and transmitting frames at a high frame rate to mitigate latency is depicted according to embodiments of the present invention. Server 105 captures frames at a high frame rate (e.g., 90 to 240 FPS) based on data representing current network conditions in network and client condition feedback 160 received from client 130. Client 130 may be a personal computer, laptop, gaming console, smartphone, tablet, thin client device, or any like computing device that is capable of receiving graphical data and providing input to server 105. Server 105 generates and captures new graphical data of graphics application 110 (e.g., a game) responsive to the input received from client 130 using capture module 115, and transmits that graphical data to client 130 for display on display device 145 over network 155 using transmit module 125. A quality-of-service (QoS) controller module 150 resident on server 105 adjusts the streaming frame rate and/or resolution based on real-time input, such as network conditions (e.g., bandwidth) and client decoder performance included in network and client condition feedback 160.

The frames transmitted by server 105 are received by client device 130 at receiving module 135. The capture module 115 is configured to mitigate capture latency, where capture latency refers to the time between the generation of a frame and when the frame is received (e.g., captured) by the streaming stack executing on server 105. While client device 130 may not be able to display graphical data at the high frame rate generated by server 105, the increased frame rate enables server 105 to respond more quickly to input received by client device 130, thereby reducing latency such that the frames displayed by client device 130 are more responsive to user input at client device 130, which improves the user experience.

Moreover, according to some embodiments, vertical sync is disabled on client device 130 when displaying received frames on display device 145, which results in lower latency because new frames can be displayed immediately without waiting on display device 145 to complete drawing a previous frame. With vertical sync disabled, client device 130 is able to play back frames at a faster rate than when client device 130 has vertical sync enabled. While disabling vertical sync may result in screen tearing, the tearing becomes less noticeable because each frame is displayed for a shorter period of time at higher frame rates. According to some embodiments, vertical sync is enabled when the actual streaming frame rate is approximately 60 FPS or less.

Using a high streaming rate to achieve low latency requires a tradeoff with video quality due to transmission bandwidth limitations. According to embodiments of the present invention, client 105 and server 130 actively monitor and control the video stream to maintain an acceptable balance between latency and video quality by adaptively lowering the streaming frequency or resolution when necessary. Graphical settings (e.g., resolution, rendering quality, post processing) of game 110 may be automatically configured at the beginning of a game streaming session to achieve a higher rendering frame rate while limiting the streaming bit rate to approximately the same value that is used by traditional 60 FPS solutions to avoid overloading the available streaming bandwidth. In some cases, capture latency can be further reduced by configuring the capture module 115 to wait for a fresh frame from game 110 before capturing.

Encoding module 120 is configured to improve encoding efficiency compared to traditional streaming techniques to avoid bandwidth increases when streaming at high frame rates. Encoding efficiency necessarily improves when streaming at higher frame rates because the difference between consecutive frames is reduced, causing traditional video compression algorithms to use less bits to encode the residual. Encoding module 120 receives network and client condition feedback 160 from client 130, including network conditions and an estimate of the current decoder performance capabilities of client 130. Based on the feedback 160, a Dynamic Frequency Change (DFC) scheme is executed by a quality-of-service module (see FIG. 2) to ensure that the streaming frame rate dynamically adjusts to current conditions to deliver the best possible frame rate suitable for the decoder, thereby reducing latency.

Furthermore, it is appreciated that for rendering an interactive game, temporal smoothness of the image subjectively outweighs the spatial sharpness of the image. Therefore, doubling the rendering frame rate from 60 FPS to 120 FPS without increasing the bit rate results in a more enjoyable streaming experience due to the improved smoothness of the gameplay, despite any negative effects on image sharpness or quality, which are less noticeable to the eye. Limiting the streaming bit rate also has the advantage of keeping the encoding and subsequent decoding times of decoding module 140 relatively low, which is important to achieve a lower end-to-end latency.

Figure 2:
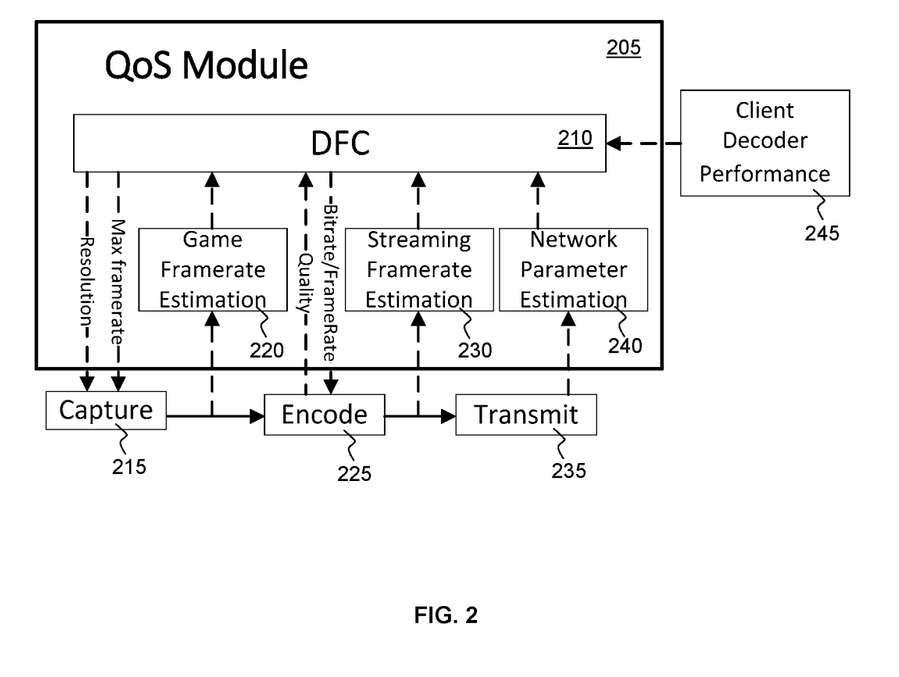
FIG. 2 is a block diagram of an exemplary quality-of-service module executing a dynamic frequency change method depicted according to embodiments of the present invention.

With regard to FIG. 2, an exemplary quality-of-service module 205 for adjusting the streaming frame rate is depicted according to embodiments of the present invention. The QoS module 205 resides on a server and executes a DFC scheme or algorithm 210 to help manage high-FPS streaming in real-time to reduce latency without overloading the available streaming bandwidth. The DFC scheme 210 dynamically adjusts the streaming frame rate of the server based on input received, such as estimated network parameters 240 received from transmit module 235, client decoder performance 245 received from a client device, current video quality of the encoded stream received from encoder module 225, estimated current streaming frame rate 230, and estimated game frame rate generation 220. The DFC scheme 210 monitors these parameters to determine streaming resolution and frame rate settings to well-balance low latency and image quality. These settings are then applied to capture module 215 when capturing new frames. Additionally, the DFC scheme 210 applies the updated streaming frame rate information to the encoder 225 to maintain the appropriate streaming bit rate.

Figure 3:
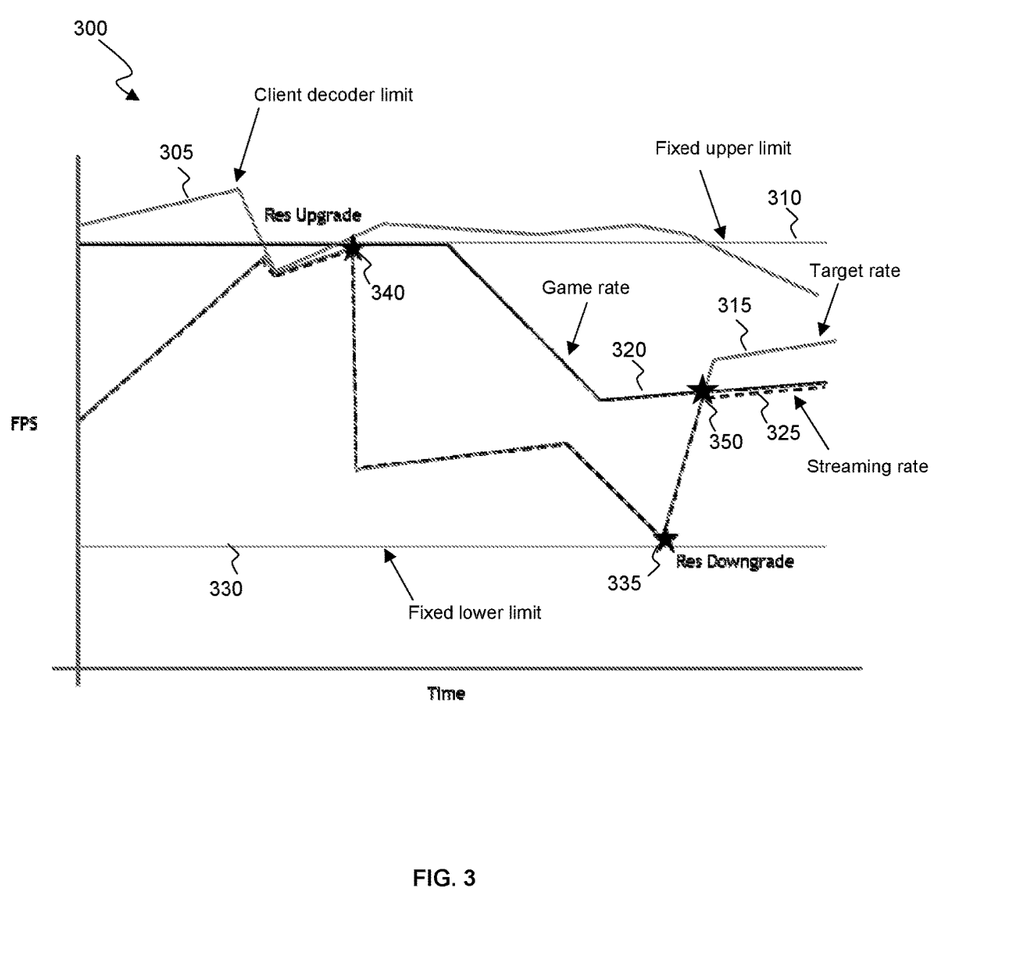
FIG. 3 is a graph depicting FPS and resolution values of an exemplary dynamic frequency change method for high-frequency streaming according to embodiments of the present invention.

FIG. 3 is a graph 300 illustrating FPS values of an exemplary high-frequency streaming method according to embodiments of the present invention. The streaming method includes executing a DFC scheme that establishes a target FPS 315 indicating the streaming FPS that the DFC scheme aims to achieve. At relatively high values, the target FPS is capped by either the decoder performance 305 of the client device or a predetermined upper FPS limit 310. A lower FPS limit 330 is set to establish a minimum desired streaming frame rate. This lower FPS limit 330 may be predetermined based on game type, client hardware, or set by the user according to their preference, for example.

Between the bounds of the upper FPS limit 310 and the lower FPS limit 330, the target FPS 315 is increased when the current encoder quality is above a threshold level, and decreased when the current encoder quality below the threshold level. FIG. 3 depicts an exemplary resolution upgrade 340 and an exemplary resolution downgrade 335.

When the encoder quality is below the threshold level even after the DFC scheme has reached the lowest acceptable FPS (e.g., 60 FPS), as depicted by resolution downgrade 335, the DFC scheme can lower the streaming resolution to reduce the workload of the streaming pipeline. When the encoder quality remains at an acceptable level while the FPS has reached the target FPS ceiling 310 (e.g., 120 FPS), as depicted by resolution upgrade 340, the DFC scheme can increase the streaming resolution to make use of the excess streaming pipeline capabilities (e.g., bandwidth) to improve the video quality.

The actual streaming FPS 325 is the lower of the target FPS and the game FPS 320. For example, as depicted at time 350, when the game is not producing frames at a high enough rate to reach the target FPS 315, the streaming FPS 325 is limited to the game FPS 320. When the game is producing frames at a high rate, the target FPS 315 limits how often the frames are captured by the video streaming pipeline so that additional frames are not captured unnecessarily.

Figure 4:
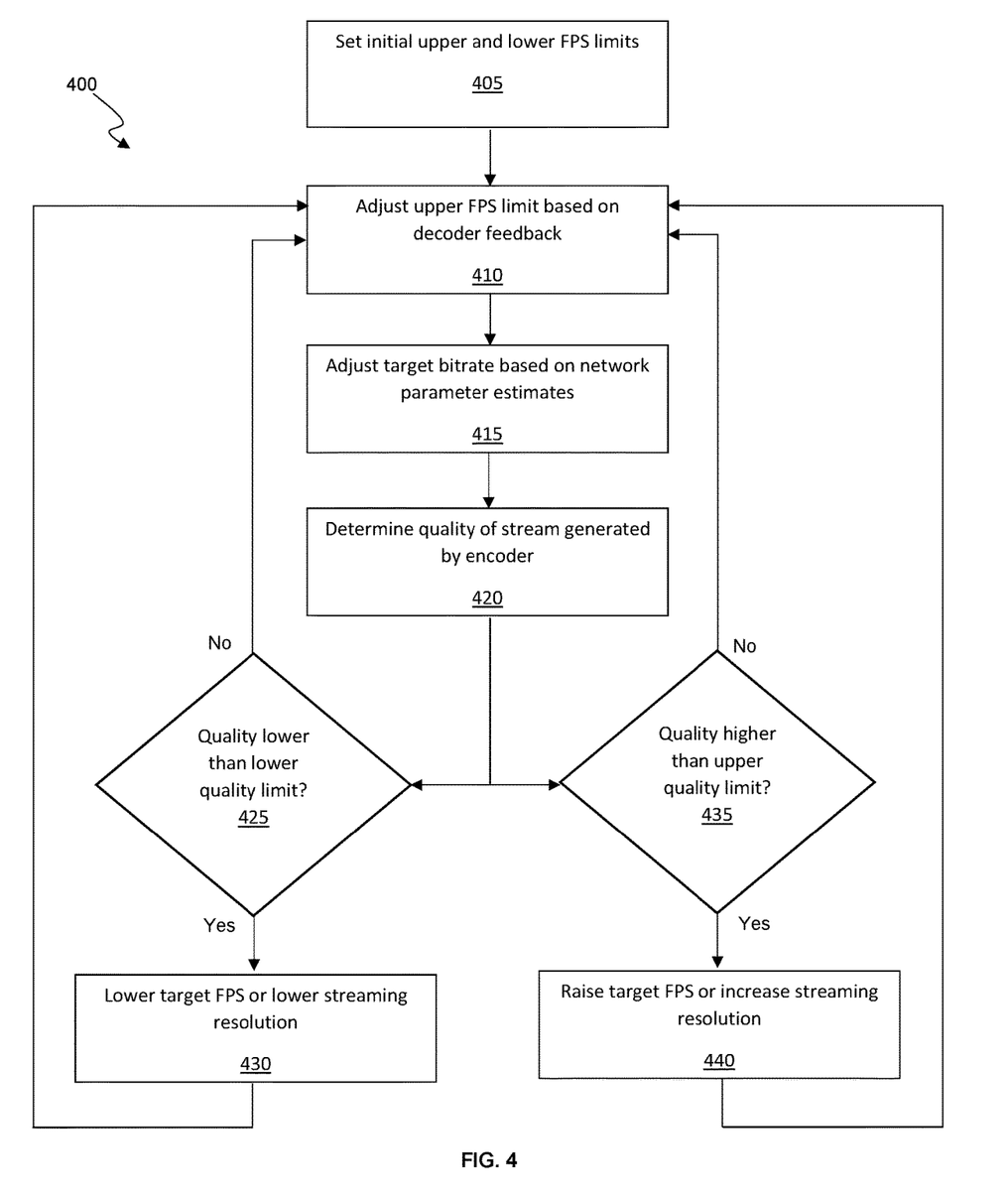
FIG. 4 is a flow chart of an exemplary dynamic frequency change method for high-frequency streaming according to embodiments of the present invention.

FIG. 4 is a flow chart depicting an exemplary sequence of computer implemented steps 400 for executing a DFC method of a QoS module to implement a high-frame rate game streaming method according to embodiments of the present invention. At step 405, initial upper and lower FPS limits are defined. For example, the initial upper FPS limit may be set according to estimated client decoder performance levels, and the initial lower FPS limit may be set to a predefined value (e.g., 60 FPS) or set based on user preference.

At step 410, the upper FPS limit may be dynamically adjusted based on feedback received from the decoder of the client device so that the server generates frames according to the capabilities of the client device. At step 415, a target streaming bit rate is adjusted according to network parameter estimates (e.g., available bandwidth) generated based on network and client condition feedback received from the client device. At step 420, the quality of the encoded stream is determined. Next, the quality of the encoded stream is compared to an upper quality limit and a lower quality limit. The upper quality limit and lower quality limit may be adjusted dynamically according to the present streaming resolution and bitrate, or may be set to static values, for example. If the quality of the encoded stream is determined to be worse than a present lower quality limit at step 425, the method attempts to lower the target FPS at step 430.

If the target FPS has already reached the lower FPS limit, the streaming resolution may be lowered. On the other hand, if the quality of the encoded stream is determined to be better than an upper quality limit at step 435, the method attempts to increase the target FPS at step 440. If the target FPS has already reached the upper FPS limit, the streaming resolution may be increased. Alternatively, according to some embodiments, the resolution may be increased even when the actual FPS is higher than the target FPS or the upper FPS limit when the upper FPS limit is set according to a static value and not according to client decoder feedback because the decoder performance has not been fully exploited. The adjusted target FPS and/or streaming resolution is used to capture subsequent frames, where the adjusted target FPS limits how quickly frames are captured from the game. Furthermore, the adjusted target FPS, resolution, and bit rate are used to configure the encoder and the output video stream thereof. Thereafter, the method returns to step 410 and the process is repeated until the streaming session has ended.

Exemplary Computer System

Embodiments of the present invention are drawn to computer systems for mitigating graphical hitches and stutter by ensuring that rendered frames are displayed in a smooth, consistent manner. The following discussion describes such exemplary computer systems, which can be used as a platform for either the described server system or the client system.

Figure 5:
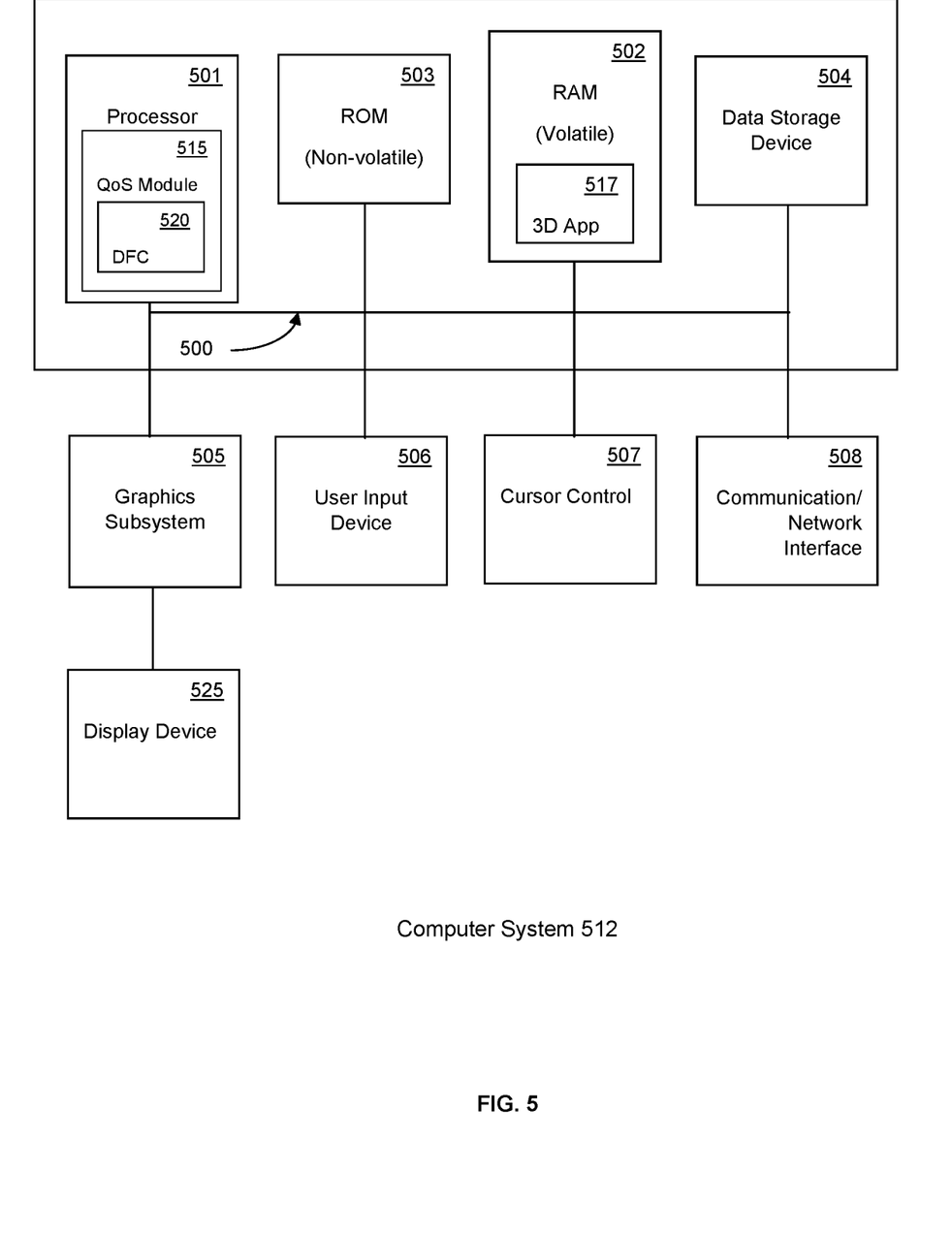
FIG. 5 is a block diagram of an exemplary computer system upon which embodiments of the present invention may be implemented.

In the example of FIG. 5, the exemplary computer system 512 includes a central processing unit (CPU) 501 for running software applications (e.g., 3D application 517) and optionally an operating system. Random access memory 502 and read-only memory 503 store applications and data for use by the CPU 501. Data storage device 504 provides non-volatile storage for applications and data and may include fixed disk drives, removable disk drives, flash memory devices, and CD-ROM, DVD-ROM or other optical storage devices. The optional user inputs 506 and 507 comprise devices that communicate inputs from one or more users to the computer system 512 (e.g., mice, joysticks, cameras, touch screens, and/or microphones).

A communication or network interface 508 allows the computer system 512 to communicate with other computer systems, networks, or devices via an electronic communications network, including wired and/or wireless communication and including an Intranet or the Internet. The display device 525 may be any device capable of displaying visual information in response to a signal from the computer system 512 and may include a flat panel touch sensitive display, for example. The components of the computer system 512, including the CPU 501, memory 502/503, data storage 504, user input devices 506, and graphics subsystem 505 may be coupled via one or more data buses 500.

In the embodiment of FIG. 5, a graphics subsystem 505 may be coupled with the data bus and the components of the computer system 512. The graphics system may comprise a physical graphics processing unit (GPU) and graphics/video memory. Graphics subsystem 505 may include one or more rasterizers, transformation engines, and geometry engines, and generates pixel data from rendering commands to create output images. A physical GPU of graphics subsystem 505 can be configured as multiple virtual GPUs that may be used in parallel (e.g., concurrently) by a number of applications or processes executing in parallel, or multiple physical GPUs may be used simultaneously. Graphics subsystem 505 can output display data to display device 525.

The computer system 512 may be a server, and the processor 501 may include a QoS module 515 configured to execute a DFC scheme or method 520 as described above according to embodiments of the present invention. For example, the DFC scheme 520 may set an initial upper FPS limit according to estimated client decoder performance levels, and an initial lower FPS limit according to a predefined value (e.g., 60 FPS) or set based on user preference. The upper FPS limit may be subsequently adjusted based on feedback received from a decoder of a client device so that the server (e.g., computer system 512) generates frames at a rate that can be handled by the client device, and a target streaming bit rate is adjusted according to network parameter estimates (e.g., available bandwidth) generated based on network and client condition feedback received from the client device.

Thereafter, if the quality of the encoded stream is determined to be lower than a present quality limit at step, the DFC scheme 520 attempts to lower the target FPS. If the target FPS has already reached the lower FPS limit, the streaming resolution may be lowered. On the other hand, if the quality of the encoded stream is determined to be higher than a present quality limit, the target FPS may be increased. If the target FPS has already reached the upper FPS limit, the streaming resolution may be increased.

According to some embodiments, a controller module (e.g., a QoS module) is operable to dynamically determine a target frame rate that is bounded at an upper bound by either said real-time client decoder performance input or a predetermined upper limit and is bounded at a lower bound by a minimum streaming threshold frame rate, where said target frame rate varies within said bounds based on said real-time encoder quality parameter, and where said frame rate supplied to said capture module is a lower of: said target frame rate and said application frame rate.

According to some embodiments, a controller module (e.g., a QoS module 515) is operable to lower the frame resolution during periods of which the target frame rate is at said lower bound and encoder quality remains unacceptable.

According to some embodiments, a controller module (e.g., a QoS module 515) module is further operable to increase the frame resolution during periods of which the target frame rate is at said upper bound and encoder quality remains good.

Figure 6:
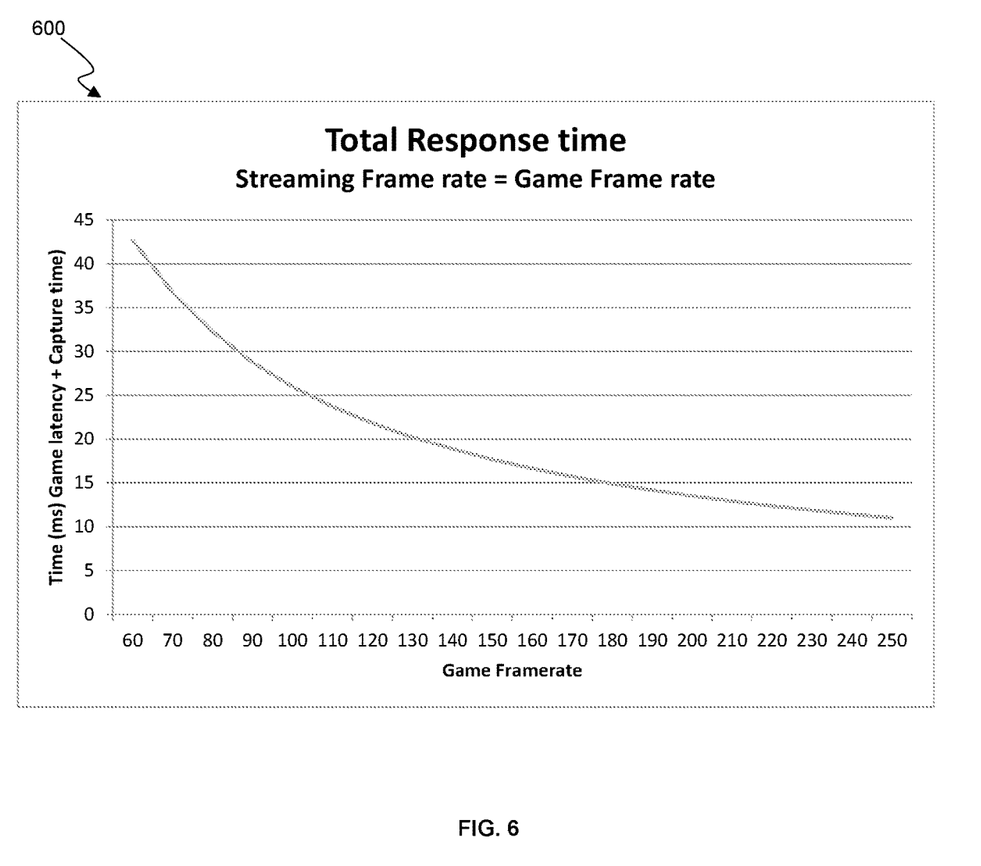
FIG. 6 is a graph of an exemplary total response time for a frame when the streaming frame rate matches the game frame rate according to embodiments of the present invention.

With regard to FIG. 6, a graph 600 of an exemplary total response time for a frame of a gaming application when the streaming frame rate matches the application frame rate is depicted according to embodiments of the present invention. As depicted, streaming the captured video stream at a higher rate allows the response frame for the key input to be sent and displayed faster. As the game frame rate increases beyond the 60 FPS baseline, the total response time (game latency+capture time) drops substantially, thereby improving the user experience. For frame rates close to 240 FPS, the total response time approaches 10 ms.

Figure 7:
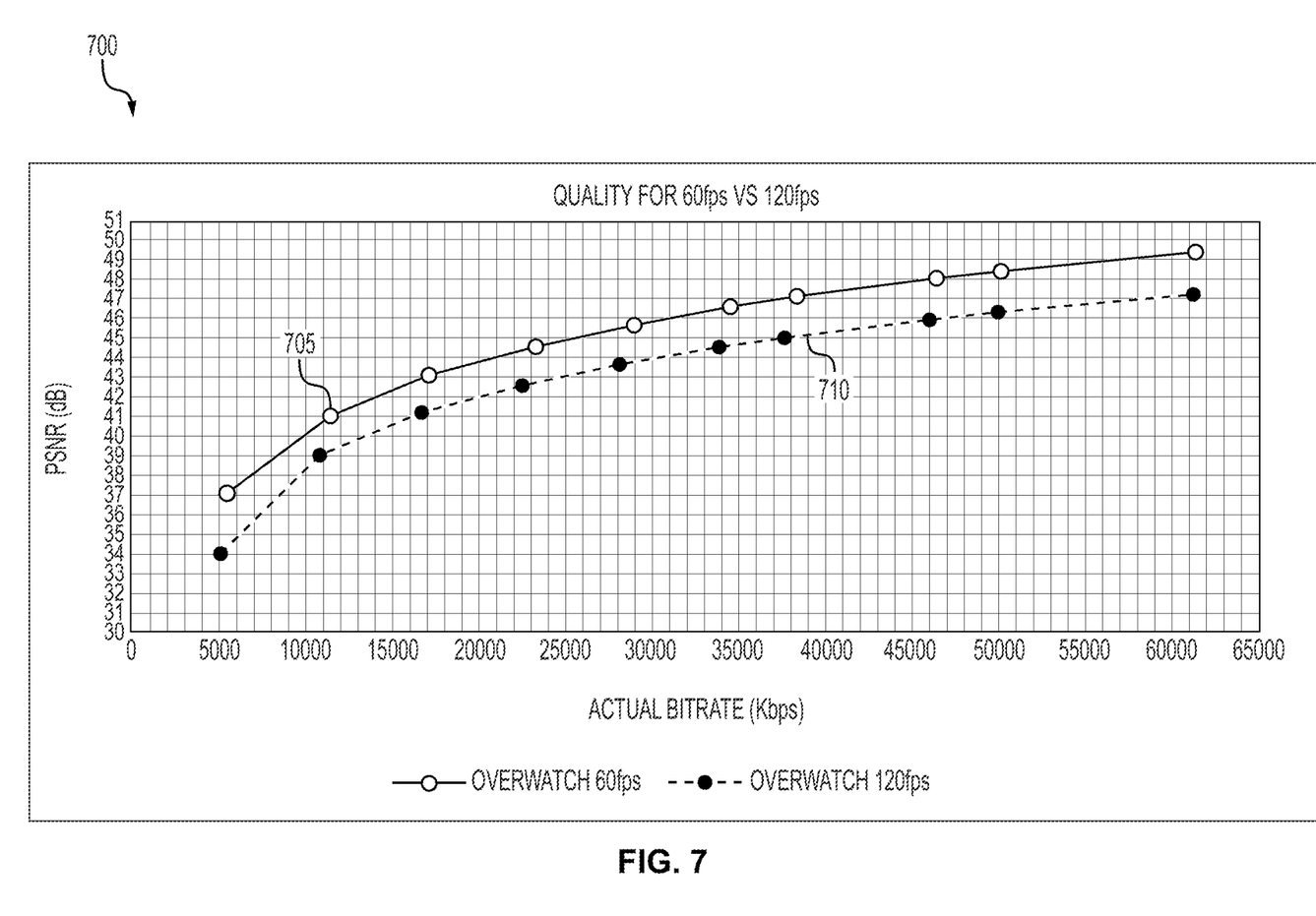
FIG. 7 is a graph depicting the quality of an exemplary video stream displayed at 60 FPS compared to the quality of an exemplary video stream displayed at 120 FPS according to embodiments of the present invention.

With regard to FIG. 7, a graph 700 depicting the quality of a video stream 705 displayed at 60 FPS compared to the quality of a video stream 710 displayed at 120 FPS is depicted according to embodiments of the present invention. For interactive games, temporal smoothness subjectively outweighs the spatial sharpness of the image. For example, when doubling the frame rate from 60 FPS to 120 FPS without increasing the bitrate, as depicted in FIG. 7, despite the lower peak-signal-to-noise ratio (PSNR), users experience less sensitivity to video quality and much higher sensitivity to the improved smoothness of the gameplay at 120 FPS. Limiting the bitrate has also an advantage of keeping encoding and subsequently decoding times low, which is important to achieve a lower end-to-end latency.

According to some embodiments, the quality of a video stream is represented by a quantization parameter (QP). The quantization parameter QP is used to calculate the quantization step size ( ) step which effectively determines how much quality is dropped. Higher QP values indicate worse video quality, and lower QP values indicate better video quality. In one example, the quantization step ( ) step is calculated as:

$$Q_{step}=2^{((QP-4)/6)}$$

Figure 8A:
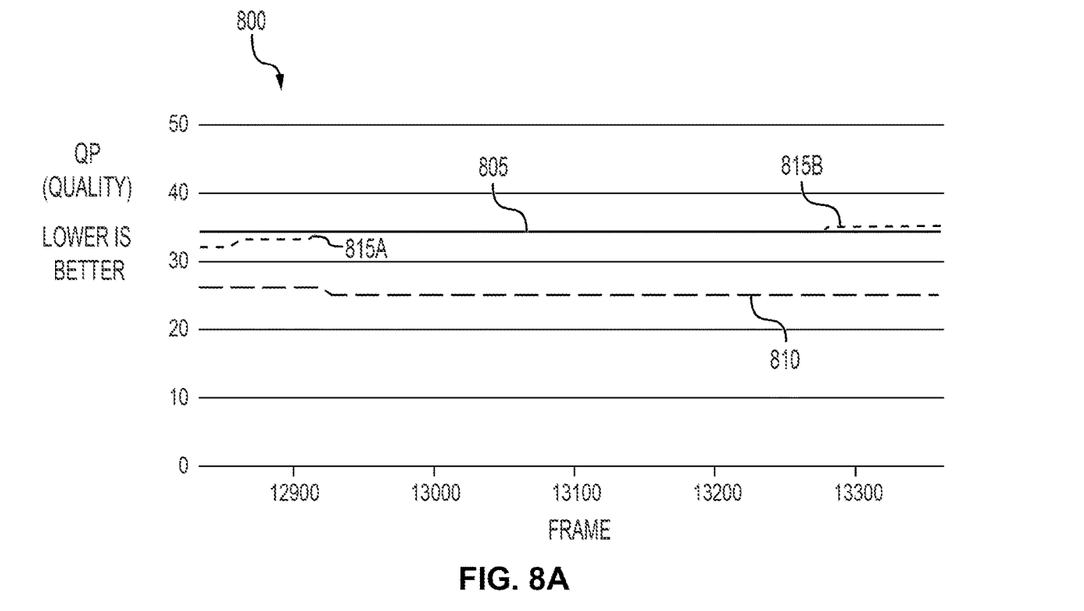
FIG. 8A is a graph depicting an exemplary quality value (e.g., a quantization parameter) of an encoded video stream above an upper quality threshold according to embodiments of the present invention, where a higher quality value indicates worse video quality.

FIG. 8A is a graph 800 depicting an exemplary quality value (e.g., a quantization parameter) of an encoded video stream according to embodiments of the present invention, where a higher quality value indicates worse video quality. Upper quality limit 805 and lower quality limit 810 may be set to static values or dynamically adjusted according to the present streaming resolution and bitrate. For example, when the video stream quality 815A is determined to be between the upper quality limit 805 and the lower quality limit 810, the quality is at an acceptable level. Thereafter, the video stream quality 815B is determined to be above the upper quality threshold, meaning the quality level of the encoded video stream is unacceptable. A DFC scheme dynamically adjusts (e.g., lowers) the target FPS to improve the quality of the encoded video stream. When the quality of the encoded video stream is still poor when the lower FPS limit has been reached, the DFC scheme may downgrade the resolution of the encoded video stream.

Figure 8B:
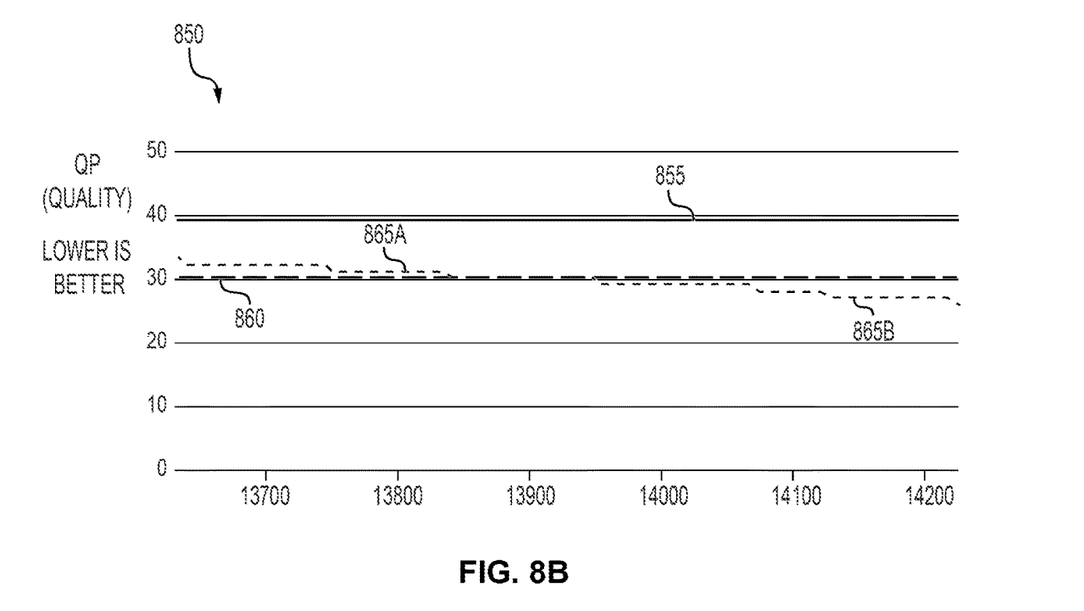
FIG. 8B is a graph depicting an exemplary quality value (e.g., a quantization parameter) of an encoded video stream below an upper quality threshold according to embodiments of the present invention, where a higher quality value indicates worse video quality.

FIG. 8B is a graph 850 depicting an exemplary quality value (e.g., a quantization parameter) of an encoded video stream according to embodiments of the present invention, where a higher quality value indicates worse video quality. Upper quality limit 855 and lower quality limit 860 may be set to static values or dynamically adjusted according to the present streaming resolution and bitrate. For example, when the video stream quality 865A is determined to be between the upper quality limit 855 and the lower quality limit 860, the quality is at an acceptable level. Thereafter, the video stream quality 865B is determined to be below the lower quality threshold, and therefore the DFC scheme may dynamically adjust (e.g., increase) the target FPS. When the upper FPS limit has been reached, the DFC scheme may increase the resolution of the encoded video stream.

Figure 9:
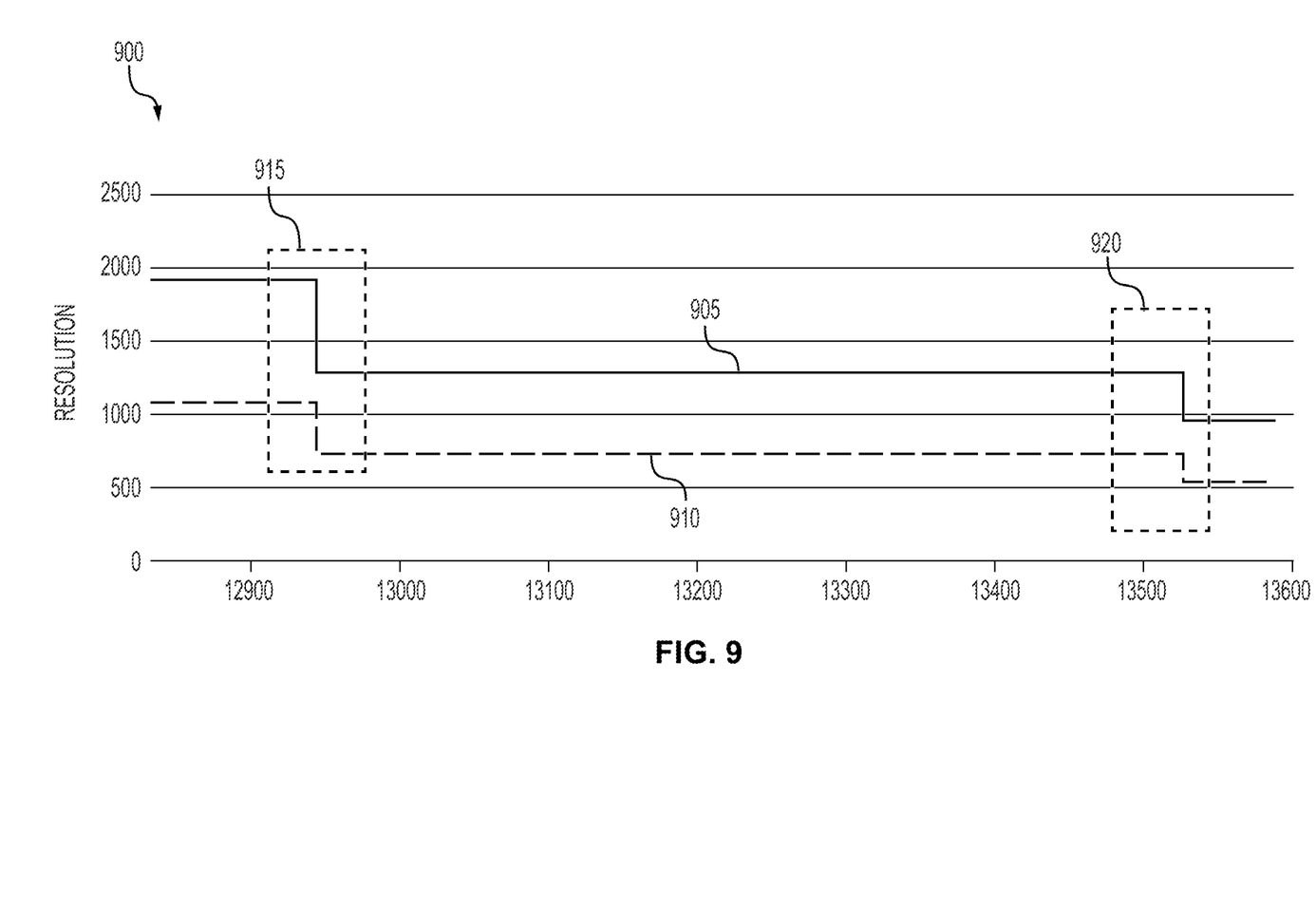
FIG. 9 is a graph depicting a series of exemplary resolution downgrades due to poor video quality according to embodiments of the present invention.

FIG. 9 is a graph 900 depicting a series of resolution downgrades due to poor video quality according to embodiments of the present invention. Due to poor quality of the encoded video stream, a DFC scheme lowers the target FPS for subsequent frames. However, when the quality of the video stream is still poor, at time 915, the resolution width 905 and resolution height 910 of the video stream are downgraded. When the quality is still below an acceptable level, another resolution downgrade is performed at time 920 to lower the resolution width 905 and resolution height 910 so that the quality of the video stream can reach an acceptable level.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

What is claimed is:
1. A method comprising:
   causing vertical sync to be enabled on a display of a client device;
   while the vertical sync is enabled, causing, using the client device, the display to present a first stream of frames received from a remotely located computing device at a first frame rate;
   determining, using the client device, at least one of a decoder performance of the client device or a network bandwidth of a network connection between the client device and the remotely located computing device;
   transmitting, using the client device, data representative of the at least one of the decoder performance or the network bandwidth to the remotely located computing device;
   receiving, using the client device and from the remotely located computing device, a second stream of frames at a second frame rate that is based at least on the at least one of the decoder performance or the network bandwidth;

based at least on the receiving the second stream of frames, causing the vertical sync to be disabled on the display of the client device; and while the vertical sync is disabled, causing, using the client device, the display to present the second stream of frames at the second frame rate.

2. The method of claim 1, wherein the second stream of frames is received at a bit rate that is equal to a corresponding bit rate for the first stream of frames.

3. The method of claim 1, wherein at least one of the second frame rate or a frame resolution is further determined based at least on an encoder performance of the remotely located computing device.

4. The method of claim 1, further comprising:
when a frame resolution reaches an upper frame resolution threshold, adjusting, using the client device, at least one of the first frame rate or the second frame rate to an increased frame rate; and when the frame resolution reaches a lower frame resolution threshold, adjusting, using the client device, at least one of the first frame rate or the second frame rate to a decreased frame rate.

5. The method of claim 1, further comprising adjusting a frame resolution to account for a change in at least one of the decoder performance or the network bandwidth, the adjusting the frame resolution including:
when at least one of the first frame rate or the second frame rate reaches an upper frame rate threshold, the frame resolution is dynamically adjusted to an increased frame resolution; and when at least one of the first frame rate or the second frame rate reaches a lower frame rate threshold, the frame resolution is dynamically adjusted to a decreased frame resolution.

6. The method of claim 1, further comprising:
receiving, using the client device, input data representative of one or more inputs to one or more input components of the client device; and transmitting, using the client device and to the remotely located computing device, the input data;

wherein at least one of the first stream of frames or the second stream of frames is rendered at the remotely located computing device based at least on the input data.

7. The method of claim 1, wherein the method is executed within a game streaming environment, and at least one of the first stream of frames or the second stream of frames corresponds to an instance of a game hosted by the remotely located computing device.

8. The method of claim 1, wherein at least one of the first frame rate or the second frame rate is between an upper frame rate threshold and a lower frame rate threshold.

9. The method of claim 1, wherein:
at least one of the first frame rate or the second frame rate is between a maximum frame rate and a minimum frame rate;

the maximum frame rate includes a target frame rate that is based at least on the at least one of the decoder performance or the network bandwidth; and the minimum frame rate is based at least on one of a set frame rate or a user selected frame rate.

10. The method of claim 1, wherein the causing the vertical sync to be disabled on the display of the client device is further based at least on the second stream of frames being at the second frame rate.

11. The method of claim 1, further comprising:
receiving, using the client device and from the remotely located computing device, a command to disable the vertical sync, wherein the causing the vertical sync to be disabled on the display of the client device is further based at least on the receiving the command.

12. A processor comprising:
one or more circuits to:
cause vertical sync to be enabled on a display of a client device;

while vertical sync is enabled, cause the display to present a first stream of frames received from a remotely located computing device at a first frame rate;

determine at least one of a decoder performance of the client device or a network bandwidth of a network connection between the client device and the remotely located computing device;

transmit, to the remotely located computing device, data representative of at least one of the decoder performance or the network bandwidth;

receive, from the remotely located computing devices, a second stream of frames at a second frame rate that is based at least on at least one of the decoder performance or the network bandwidth;

based at least on the receiving the second stream of frames, cause the vertical sync to be disabled; and while the vertical sync is disabled, cause the display to present the second stream of frames at the second frame rate.

13. The processor of claim 12, wherein the one or more circuits are further to adjust a frame resolution to account for a change in at least one of the decoder performance or the network bandwidth, the adjusting the frame resolution including:
when at least one of the first frame rate or the second frame rate reaches an upper frame rate threshold, the frame resolution is dynamically adjusted to an increased frame resolution; and when at least one of the first frame rate or the second frame rate reaches a lower frame rate threshold, the frame resolution is dynamically adjusted to a decreased frame resolution.

14. The processor of claim 12, wherein the one or more circuits are further to:
when a frame resolution reaches an upper frame resolution threshold, adjust at least one of the first frame rate or the second frame rate to an increased frame rate; and when the frame resolution reaches a lower frame resolution threshold, adjust at least one of the first frame rate or the second frame rate to a decreased frame rate.

15. The processor of claim 12, wherein the causation of the vertical sync to be disabled is further based at least on the second stream of frames being at the second frame rate.

16. A method comprising:
streaming, using a computing device and to a client device, a first stream of frames at a first frame rate, wherein the client device enables vertical sync on a display based at least on the first frame rate;

receiving, using the computing device and from the client device, data representative of at least one of a decoder performance of the client device or a network bandwidth of a network connection of the client device;

determining, based at least on the at least one of the decoder performance or the network bandwidth, a second frame rate for streaming a second stream of frames to the client device; and streaming, using the computing device and to the client device, the second stream of frames at the second frame rate, wherein the client device disables vertical sync on the display based at least on the second frame rate.

17. The method of claim 16, further comprising:

when a frame resolution reaches an upper frame resolution threshold, adjusting at least one of the first frame rate or the second frame rate to an increased frame rate; and when the frame resolution reaches a lower frame resolution threshold, adjusting at least one of the first frame rate or the second frame rate to a decreased frame rate.

18. The method of claim 16, further comprising adjusting a frame resolution to account for a change in at least one of the decoder performance, the network bandwidth, or an encoder performance, the adjusting the frame resolution including:

when at least one of the first frame rate or the second frame rate reaches an upper frame rate threshold, the frame resolution is dynamically adjusted to an increased frame resolution; and when at least one of the first frame rate or the second frame rate reaches a lower frame rate threshold, the frame resolution is dynamically adjusted to a decreased frame resolution.

19. The method of claim 16, wherein at least one of the first frame rate or the second frame rate is between an upper frame rate threshold and a lower frame rate threshold.

20. The method of claim 16, further comprising:

setting a maximum frame rate based at least on the decoder performance; and setting a minimum frame rate based at least on a set frame rate or a user selected frame rate, wherein at least one of the first frame rate or the second frame rate is between the maximum frame rate and the minimum frame rate.

* * * * *